United States Patent [19]

Hodges

[11] E Patent Number: Re. 32,481

[45] Reissued Date of Patent: Aug. 25, 1987

[54] BOARDING APPARATUS

[75] Inventor: Michael J. Hodges, High Wycombe, England

[73] Assignee: Detexomat Machinery Limited, Buckinghamshire, England

[21] Appl. No.: 755,300

[22] Filed: Jul. 15, 1985

Related U.S. Patent Documents

Reissue of:

[64] Patent No.: 4,434,918
Issued: Mar. 6, 1984
Appl. No.: 341,638
Filed: Jan. 22, 1982

[30] Foreign Application Priority Data

Jan. 23, 1981 [GB] United Kingdom ..... 8102139

[51] Int. Cl.[4] ..... D06C 5/00

[52] U.S. Cl. ..... 223/75; 223/76

[58] Field of Search ..... 223/75, 76, 42, 43; 112/121.15

[56] References Cited

U.S. PATENT DOCUMENTS

| | | | |
|---|---|---|---|
| 1,402,788 | 1/1922 | O'Oleary | 223/77 |
| 2,413,994 | 1/1947 | Otis | 223/76 |
| 2,487,046 | 11/1949 | Duff et al. | 223/76 X |
| 2,722,348 | 11/1955 | Ammon | 223/43 |
| 2,760,697 | 8/1956 | Shoaf | 223/42 |
| 2,869,765 | 1/1959 | Laxson | 223/43 |
| 2,890,818 | 6/1959 | Harralson | 223/43 |
| 2,957,613 | 10/1960 | Autem | 223/43 |
| 2,979,802 | 4/1961 | Funchion et al. | 26/7 |
| 3,126,134 | 3/1964 | McAnally | 223/43 |
| 3,131,839 | 5/1964 | Norman et al. | 223/43 |
| 3,429,284 | 2/1969 | Bryan | 112/2 |
| 3,520,454 | 7/1970 | Saltiel | 223/43 |
| 3,532,258 | 10/1970 | Kienel | 223/43 |
| 3,738,294 | 6/1973 | Christiansen | 112/121.15 |
| 3,875,880 | 4/1975 | Hazelgrove et al. | 112/121.15 |
| 3,908,874 | 9/1975 | Haselgrove et al. | 223/43 |
| 4,133,276 | 1/1979 | Selvi | 112/121.15 |
| 4,440,329 | 4/1984 | Hodges | 223/43 |
| 4,487,546 | 12/1984 | Cassinelli | 223/112 X |
| 4,532,875 | 8/1985 | Gazzarrini | 112/121.15 X |
| 4,550,868 | 11/1985 | Hodges et al. | 223/75 X |
| 4,564,133 | 1/1986 | Gazzarrini | 223/75 X |

FOREIGN PATENT DOCUMENTS

| | | |
|---|---|---|
| 1408912 | 10/1975 | United Kingdom . |
| 1501869 | 2/1978 | United Kingdom . |
| 2013738 | 1/1979 | United Kingdom . |
| 2042322 | 9/1980 | United Kingdom . |
| 1577758 | 10/1980 | United Kingdom . |
| 2066862 | 7/1981 | United Kingdom . |
| 2081321 | 2/1982 | United Kingdom . |

*Primary Examiner*—Louis K. Rimrodt
*Attorney, Agent, or Firm*—Dority & Manning

[57] ABSTRACT

Hosiery toe closing and boarding apparatus has a pair of heatable boarding forms to which hose are fed by a reciprocally-acting transfer mechanism from carriers of a known toe closing machine. The boarding forms are mounted to a turret to move between hose-receiving and hose-discharging positions respectively associated with wind-on and wind-off rollers. At their ends remote from the toe closing machine the boarding forms are interconnected by a hinge with a rotatably-drivable hinge pin for causing one form to swing into a superposed, registered position over the other form immediately prior to discharge of the hose from the boarding apparatus.

37 Claims, 5 Drawing Figures

BOARDING APPARATUS

Matter enclosed in heavy brackets [ ] appears in the original patent but forms no part of this reissue specification; matter printed in italics indicates the additions made by reissue.

The present invention relates to a boarding apparatus and method useful in the manufacture of hosiery, e.g. ladies stockings and mens socks.

In the course of their manufacture, hosiery articles tend to become significantly crumpled. They are accordingly "boarded" or placed on generally flat, elongated boarding forms where they may be inspected for flaws, if desired. Mounting the hosiery articles can involve stretching them and/or heat-setting (shrinking) them on the forms to accomplish the desired smoothing. The articles are subsequently carefully removed from the forms and laid out flat prior to packaging or assembly into pairs.

One present aim has been to devise apparatus and method capable of minimising the need for manual operations, and capable either of delivering paired stockings or socks laid one on the other ready for packing, or of delivering pantihose garments ready for packing, their legs being placed one upon the other. Advantageously, apparatus embodying the invention is adapted to operate in conjunction with a toe closing machine.

According to the present invention there is provided hosiery boarding apparatus comprising a pair of flat, elongated boarding forms onto which hosiery legs are to be stretched, the forms extending lengthwise parallel to one another and being interconnected through hinge means located remote from the free, hose-receiving ends thereof, and means for effecting a hinging movement about an axis which is parallel to the forms whereby the forms can be selectively brought into or out of a contiguous, superposed hose-discharge relationship.

The invention also provides hosiery toe closing and boarding machinery comprising: a toe closer which includes a plurality of hose carriers, a seamer and means for presenting toe ends of hose mounted on the carriers to the seamer for their toe ends to be closed, the hose carriers being movable to a transfer position following seaming of the hose thereon; a transfer mechanism operable to take hold of welt or body ends of hose on the carriers at the transfer position and to convey and deposit them on a boarding apparatus; and the boarding apparatus comprising a pair of flat, elongated boarding forms onto which the hose are to be stretched, the forms extending lengthwise parallel to one another towards the carriers at the transfer position, and the forms being interconnected through hinge means located remote from the free, hose-receiving ends thereof for a hinging movement whereby the forms can be selectively brought into and out of a contiguous, superposed hose-discharge relationship.

The invention further provides a method of boarding hosiery comprising the steps of stretching a pair of hose legs over two elongated, flat boarding forms which are disposed side by side in a common plane, swinging one form about a hinge axis parallel to the forms so as to place the said one form in registered superposition over the other form, and thereafter drawing the two hose legs together off the forms.

*This invention further provides for apparatus for the transfer of hosiery, and particularly pantihose from one machine that performs an operation in the manufacture of hosiery to another machine that performs an operation in the manufacture of hosiery.*

The invention will now be described by way of example only with reference to the accompanying drawings, in which:

FIG. 1 diagrammatically illustrates boarding apparatus according to the invention, associated with a toe closing machine;

Figure 2:
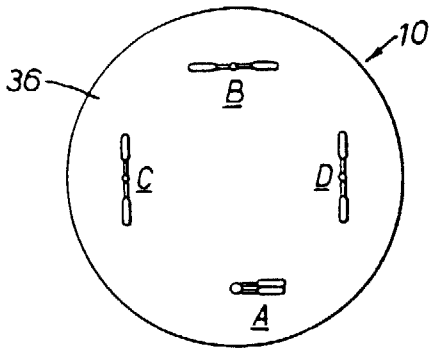
FIG. 2 is a front elevation of a turret supporting a plurality of boarding forms according to the invention.

Boarding apparatus 10 shown in the drawings has been arranged to operate in conjunction with an automatic toe closer machine, but could be adapted readily to operate as a separate machine. The following description details the construction presently prepared for use with a toe closer, and will terminate with a discussion of possible modifications.

Figure 5:
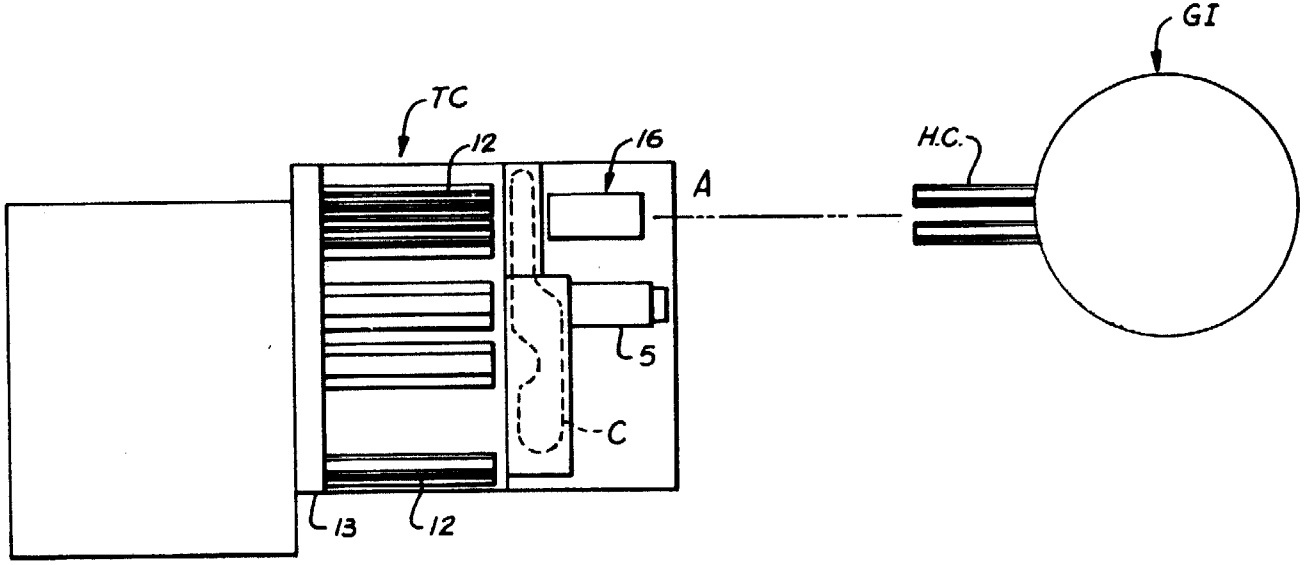
*FIG. 5 is a schematic illustration of a toe closer in association with a further hosiery processing machine and with a transfer apparatus located therewith according to the teachings of the present invention.*

The boarding apparatus 10 can be used with an automatic toe closer which operates along the lines of the Detexomat Pantimatic and Speedomatic HS machines. These machines are described in British patent specification Nos. 1,501,869; 1,577,758 *which corresponds to U.S. Pat. No. 4,192,242* and 8,037,143, (publication No. 2,066,862), *which corresponds to U.S. Pat. No. 4,383,491*, all in the name of Detexomat Machinery Limited of High Wycombe, England. *A toe closer of the type referred to is schematically illustrated in FIG. 5.* In these machines, hosiery articles for toe closing are mounted on leg carriers 12 which project from indexably rotatable turrets 13. In use, hose legs are everted with the aid of suction created in the leg carriers, and are drawn lengthwise over the carriers. After accurately positioning the hose toe ends on the carriers, positioning being accomplished manually or preferably automatically, the toe ends are displaced forwardly from the carriers 12 into a movable clamp *C*. The clamp takes hold of toe ends fed thereinto and advances them past a seamer *5*, usually a sewing machine, which seams the toe ends closed and trims them to shape. Then, after release of the toe ends from the clamp following seaming, the toe ends are pulled back onto their carriers 12. During the cycle of operations of the toe closers, their turrets 13 index about their turning axes.

With the present equipment, a stage is reached when the turret 13 has indexed to a position in which a pair of carriers 12 bearing toe-seamed hose are aligned with two receiving boarding forms 14, 15 of the boarding apparatus 10. A transfer mechanism 16 is provided to carry the toe-seamed hose to these boarding forms 14, 15.

The transfer mechanism 16 comprises a hose transporter 18 and a drive 20 for moving the transporter to and fro between the carriers 12 and the forms 14, 15. The transporter 18 as shown consists of a carriage and two hose holding means 21, the transporter carriage being mounted for guided movement to and fro along rails 22. The hose holding means 21 can be upstanding hooks as illustrated or grippers such as pincers for positively grasping the hose.

The transporter drive 20 operates to move the carriage reciprocally in timed relation to arrival of the carriers 12 bearing toe-seamed hose into alignment with the waiting boarding forms 14, 15. The carriage could be driven continuously to and fro, although it may be preferably for it to move intermittently, resting at a convenient ready position before it is required to move to the turret 13 and then to the boarding forms. The transporter 18 can be driven by an electric motor via a transmission such as a drive chain 24 trained around sprockets 25, 26 located adjacent the turret 13 and the boarding forms 14, 15, respectively. One of the sprockets is driven by the motor, which can be of reversible type. If the motor is unidirectional, the carriage is connected to the chain 24 by a lost motion coupling 28. Chain drive transmissions are not obligatory, and lead-screw drives, hydraulic drives and so on can be substituted.

The transfer operation will be understood from the foregoing. Suffice it to say that with toe closers which close the toes of already joined legs of pantihose garments, e.g. the Pantimatic, the holding means 21 take hold of the waist band and carry the garment waist-first to the boarding forms. For stockings and mens hose, however, the holding means 21 take hold of the welt ends of respective hose legs. When the transporter 18 commences its forward movement, suction can be created in the carriers 12 to suck in the hose legs, so as to effect an eversion thereof. The transfer mechanism 16 is responsible for drawing the garment body and the garment legs (or the separate legs of stockings and mens hose) partially onto the boarding forms 14,15. The holding means 21 release the hosiery once it has passed beneath a drawing-on means, e.g. a rotationally-driven roller 30. Roller 30 is caused to engage the hosiery and, thanks to its rotation, serves to draw the hosiery fully onto the forms 14,15. The roller may, if desired, be arranged to draw the hosiery tightly onto the forms so as to stretch and straighten the toe seams.

The boarding forms 14, 15 are both substantially identical, elongated and generally flat members. The forms 14, 15 extend toward the turret 13 and are in spaced-apart, parallel side-by-side relationship in their hose-receiving position. In this position, the forms and their transverse or widthwise planes are coplanar. A hinge means 31 interconnects the forms adjacent their rearmost ends, a butt hinge being shown.

Figure 1:
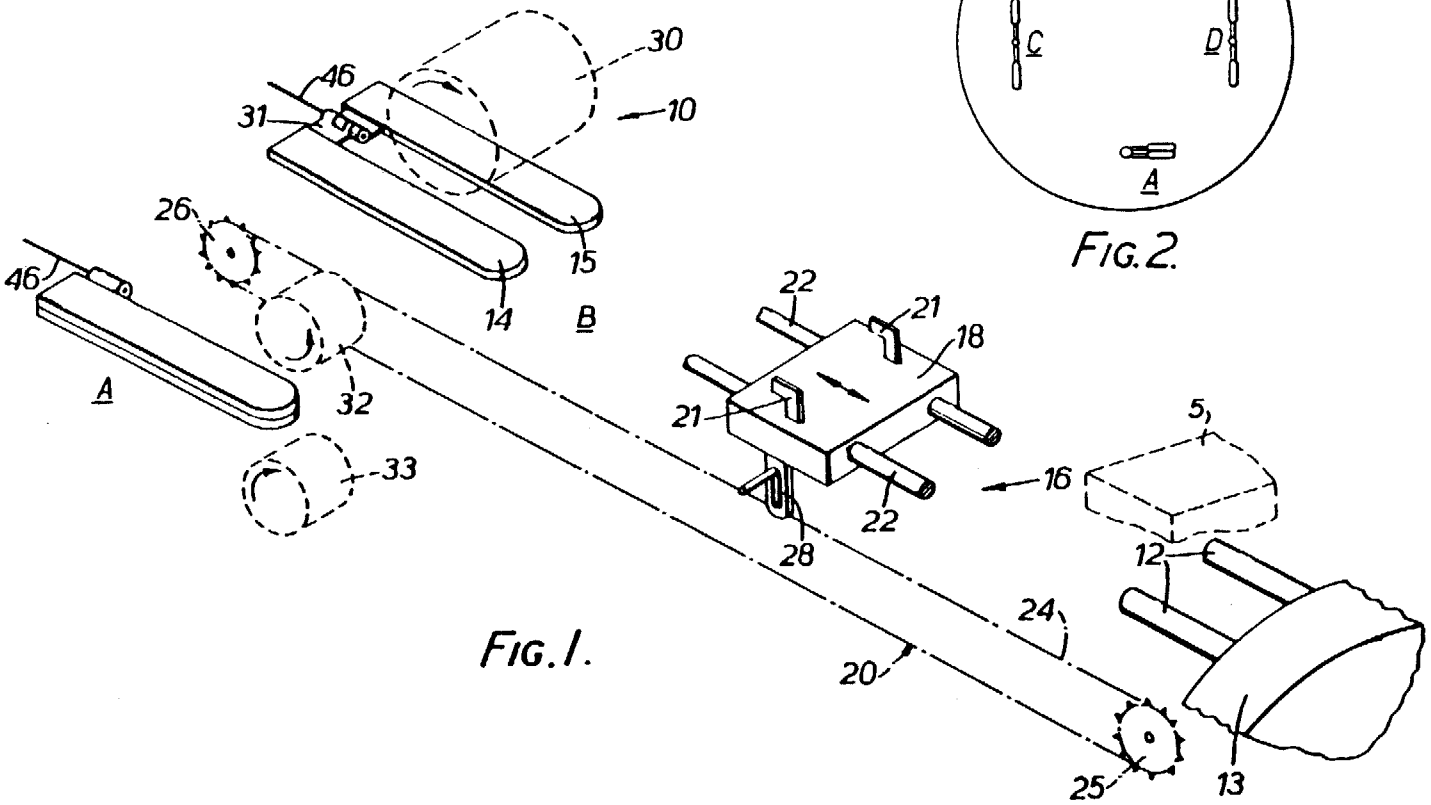

Having received hosiery thereon, the forms 14, 15 are moved to a discharge position (at A in FIG. 1). Prior to discharge of the hosiery, one form, 15, is swung about the axis of the hinge 31 to a position closely overlying the other form 14. Thereafter the hosiery is discharged, legs superposed, onto a receiving table 35. Discharge is accomplished by drawing-off means such as rotationally-driven wind-off rollers 32, 33 movable towards one another to provide a discharge nip.

Movement of the forms 14, 15 between the hose receiving and discharge positions could involve a lateral shuttling motion.

Preferably indexing movement is employed, the forms 14, 15 being mounted on a rotatable turret 36, see FIG. 2. Four pairs of forms 14, 15 are shown, though fewer or more can be provided. A is again the discharge position and B is the receiving position. The turrets 36 and 13 are driven in synchronism; once one pair of forms 14, 15 has had hosiery transferred thereto, these forms make way for the next adjacent pair—as the turret 36 indexes—to receive hosiery from the toe closer.

The superposed forms 14, 15 at position A have their transverse planes horizontal to suit discharge onto a horizontal table 35. Assuming the carriers 12 arriving in alignment with the forms for hosiery transfer are in a horizontal plane, the forms will be horizontally disposed at position B, see FIG. 2. Such horizontal attitudes may not always be convenient, however. For example, some toe closers may be so designed that the carriers 12 at the hose-transfer position can only be vertically disposed. Positions C or D, FIG. 2, will then represent the hose-receiving positions of the forms 14, 15. Clearly, in some cases the carriers 12 may be neither horizontal nor vertical at the hose-transfer position and it will be recognised that whatever their attitude, the attitude of the forms 14, 15 must match it.

Figure 3:
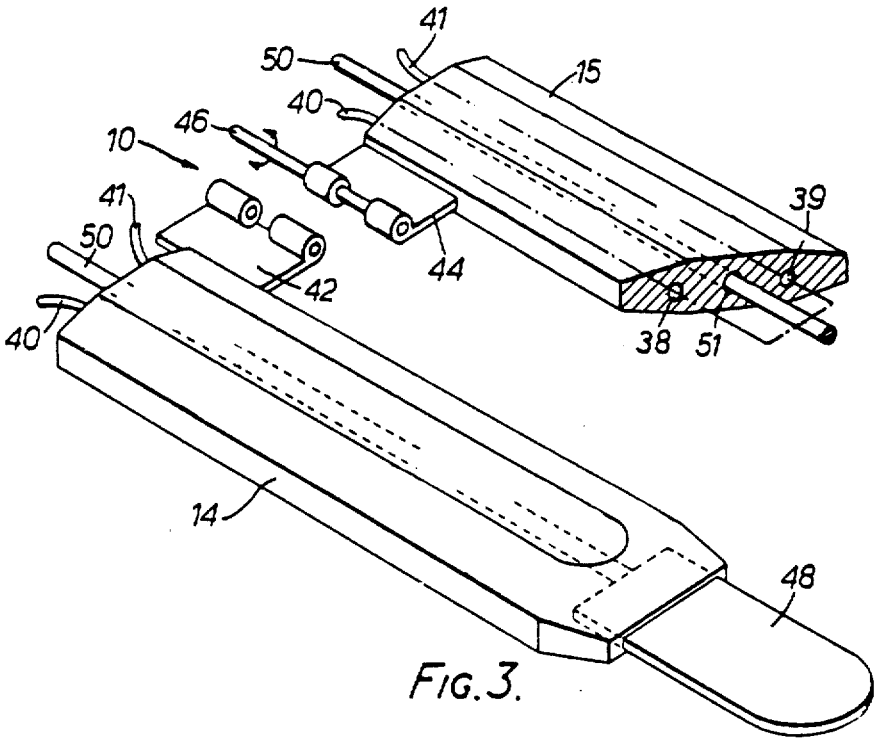
FIG. 3 is a fragmentary perspective drawing of a pair of the boarding forms.

The boarding forms 14, 15 and their arrangement are shown in more detail in FIG. 3. Each form is of shallow box form tapering towards each of its longitudinal edges and tapering also at its free end remote from the turret 36. Edges and corners of the forms are rounded (not shown) to guard against damaging the delicate hosiery fabric. The forms can be of solid or hollow construction and optionally can be raised to a moderately elevated temperature for heat setting. Heating means for the forms can be electrical or can involve a flowing heating medium. In the illustrated example, heating is by the latter expedient. Accordingly, the forms have internal flow ducts 38, 39 served by flow and return lines 40, 41. The heating medium can be a heated oil.

Each form 14, 15 is made fast with its respective hinge flap 42, 44 in any convenient way, and one form 14 is fast with turret 36. The hinge 31 has a hinge pin 46 which, when installed, is freely rotatable in flap 42 but is fast against rotation in flap 44. The hinge pin 46 extends via an opening in the turret 36 to means for rotating it to and fro, for swinging the form 15 through 180°, between its two positions relative to the other form 14. A convenient rotating means can be employed. For example, a suitably-controlled reversible motor could act on the hinge pin, or camming means could be provided with which the hinge pin coacts during rotation of the turret. The hinge pin 46 could carry a pinion engageable with a pair of stationary, arcuate racks as the turret indexes and its forms move from positions C to A and from A to D. A possible camming means for rotating the hinge pin 46 might consist of stationary strikers or ramps engageable with a crank arm on the hinge pin during passage of the forms from positions C to D via A.

Figure 4:
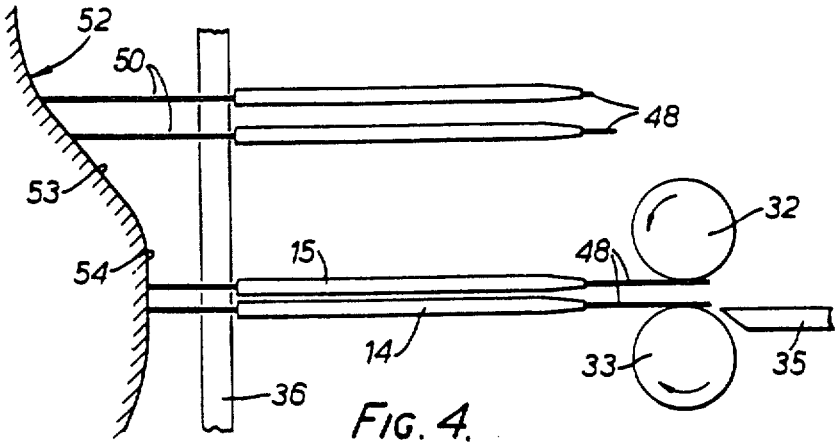
FIG. 4 is a schematic illustration of the boarding apparatus during a delivery phase of its operation.

To assist discharge of hosiery by the rollers 32, 33, each form 14, 15 is desirably extensible by means of axially-movable tongues 48 telescopically received within the free ends of the forms. The tongues are conveniently made of flexible sheet metal. Each tongue 48 is movable from a position located wholly within its form to an extended position entering the nip of the discharge rollers 32, 33. The tongues have their inner ends secured to push rods 50 extending lengthwise through the forms in passages 51. Any convenient means can be furnished for moving the rods 50 and tongues 48, one example being shown in schematic form in FIG. 4. Thus, the rods can pass through openings in the turret 36 for engagement with a cam 52 which is shown in developed form. The cam is stationary in a location centered on the discharge position. As each pair of forms approaches this position their respective push rods 50 contact and ride over the cam along its rise 53 to the dwell 54, and are thus shifted lengthwise to eject the tongues 48. For returning the tongues 48 to their inner or housed positions, spring means can act on the push rods.

As indicated above, heating is optional but commonly preferred; if desired, a final flattening or pressing can be accomplished by use of heated rolls 32, 33.

The turret-mounted boarding forms shown in FIG. 2 are aligned with chords of the circularly shaped turret 36. This alignment is not essential to the invention and the forms could, for instance be aligned with radii instead.

The boarding apparatus 10 particularly described has been designed for use with a toe closing machine, and is able to handle both pantihose garments and stockings or socks. Many hosiery mills may prefer to divorce the boarding apparatus from toe closers, in which case the boarding apparatus can take various forms. Firstly, the apparatus 10 can be provided with an automatic loader based on the transfer mechanism 16: all the operator has to do is to attach the hose to the loader. Actuation of the loader and the boarding apparatus can be under the operator's control, thus enabling the operator to influence operating speed. Alternatively, the equipment could be continuously run at a speed within the operator's capacity for feeding hosiery thereto.

Mounting hosiery on the boarding forms 14, 15 can be accomplished manually, so the loader can be omitted.

Though turret mounting of the forms 14, 15 has many advantages even when the boarding apparatus is divorced from the toe closer, if desired the forms could be mounted on a shuttle to move from a loading to a discharge position.

A very simple version of the apparatus can consist of just the hingedly-connected forms 14, 15 and means to discharge hose therefrom; the forms are mounted in a fixed location whereat both loading and discharging take place. Displacement of the movable form 15 can be accomplished manually.

The transfer mechanism 16 as described operates to load both forms 14, 15 simultaneously, and hence suits the handling of pantihose garments. The equipment can be readily adapted, if desired, or an associated toe closer so demands, to permit the boarding forms to be loaded sequentially.

The invention is applicable to other hosiery manufacturing equipment which has a first elongated hose carrier at one operation station confronted by a second elongated hose carrier at a second operation station. The first carrier can be an integral part of a hosiery inspection apparatus, a toe closer or a suction everter. Then, the second carrier can be inter alia a toe closer or a suction everter. In one hosiery manufacturing arrangement, the first carrier can comprise part of a toe closer on which the toes of pantihose are closed; the second carrier can be a hose carrier of a gusset inserting machine by which gussets are inserted into the crutch area of the pantihose. The first carrier can be an integral part of an everting hose loader for the gusset inserting machine. For transferring the hosiery from the first to the second operation station, the transfer mechanism can be constructed and operational as described hereinbefore. Thus, it moves to and fro between the two endwise-aligned carriers from a hosiery collecting position spaced rearwardly of the free end of the first carrier, to a hosiery-depositing position attained when the transfer mechanism has moved along its path beyond the free end of the second carrier.

*Referring to FIG. 5, by way of example, the present invention is schematically illustrated to demonstrate a transfer mechanism 16 associated with a toe closer TC and a gusset inserter GI for the transfer of pantihose therebetween. After the toes of the legs of the pantihose (not shown) have been closed by seamer 5, and turret 13 has indexed further, the leg tubes 12 on which the pantihose garment are located are presented at a location A adjacent the transfer mechanism 16. With a hose carrier HC of gusset inserter GI aligned with leg carriers 12, or moving into proper alignment, the waist portion of the pantihose is engaged by engaging elements 21 of transfer mechanism 16, after which transfer mechanism 16 moves away from toe closer TC toward gusset inserter GI. The pantihose is thus removed from the toe closer TC and transferred by transfer mechanism 16 to gusset inserter GI where it is then deposited onto hose carrier HC of gusset inserter GI for a further operation, e.g. insertion of a gusset into the crutch area of the pantihose.*

*Obviously a reverse arrangement is also possible where following insertion of a gusset into the crutch area of a pantihose garment on gusset inserter GI while the pantihose is located on hose carrier HC element 21 of a transfer mechanism 16 moves toward toe closer TC and deposits the pantihose onto a pair of leg tubes 12. In such an arrangement obviously the leg tubes 12 that receive the pantihose from gusset inserter GI would be located at an opposite end of toe closer TC as that shown in FIG. 5.*

I claim:

1. Hosiery boarding apparatus comprising a pair of flat, elongated boarding forms onto which hosiery legs are to be stretched, said forms extending lengthwise parallel to one another, hinge means located remote from free, hose-receiving ends of said forms interconnecting said forms, means for effecting a hinging movement about an axis parallel to said forms whereby said forms can be selectively brought into and out of a contiguous, superposed hose-discharge relationship, and said forms at their free ends including outwardly ejectable tongues, said ejectable tongues being telescopically mounted at the said free ends and operable when said forms are superposed for advancing toe ends of hosiery mounted on said forms forwardly, said apparatus further including hosiery dispensing means operable when said toe ends are introduced into a nip thereof to draw said hosiery from the forms with the hosiery legs lying one on the other.

2. Apparatus according to claim 1, wherein a flap hinge forms said hinge means and the hinging movement is through 180° about said axis.

3. Apparatus according to claim 2, wherein one form only is movable around said axis into and out of a superposed relationship with respect to the other form.

4. Apparatus according to claim 3, wherein said hinge has two flaps each secured to a respective one of said forms, and has a hinge pin fast against rotation in the flap secured to the said one form and free for rotation in the other flap, the means for effecting hinging movement being connected to said hinge pin to rotate the pin and thereby move the said one form around the axis of the hinge pin.

5. Apparatus according to claim 1, wherein said forms are adapted to subject hosiery articles mounted thereon to heat for heat setting the fabric, and have internal passages for the circulation of a heating medium therethrough.

6. Apparatus according to claim 1, wherein a push rod secured to each tongue extends through the length of the associated form to means for displacing the push rod and tongue lengthwise of the form.

7. Apparatus according to claim 6, wherein said displacing means is a cam, and the push rod and tongue are displaceable for ejecting the tongue against a return spring bias.

8. Apparatus according to claim 1, wherein the pair of forms, and a plurality of other pairs of identical forms, are mounted on an indexable turret for continual movement between hose-loading and hose-dispensing positions.

9. Apparatus according to claim 1, further including a hose-loading mechanism operable to place a hose body end first partially on each of said forms, and a drawing-on means operable to pull the partially-mounted hose fully onto said forms.

10. Hosiery toe closing and boarding machinery comprising: a toe closer having a plurality of hose carriers, a seamer and means for presenting toe ends of hose mounted on said carriers to the seamer for their toe ends to be closed, said hose carriers being movable to a transfer position following seaming of the hose thereon; a transfer mechanism operable to take hold of body ends of hose on the carriers at the transfer position and to convey and deposit them on a boarding apparatus; and said boarding apparatus comprising a pair of flat, elongated boarding forms onto which the hose are to be stretched, said forms extending lengthwise parallel to one another towards said carriers at the transfer position, and hinge means interconnecting said forms at a position located remote from their hose-receiving ends thereof for a hinging movement whereby said forms can be selectively brought into and out of a contiguous, superposed hose-discharge relationship.

11. Machinery according to claim 10, wherein said forms are disposed in alignment with said carriers at the transfer position, and said transfer mechanism comprises a carriage movable along a guide path extending between said carriers and said forms, hose holders projecting from said carriage and engageable with hose on the carriers, and drive means for moving said carriage along said path for repetitively collecting and conveying toe-seamed hose to the boarding apparatus.

12. Machinery according to claim 10, wherein a flap hinge forms the hinge means and provides for hinging movement through 180°.

13. Machinery according to claim 12, wherein one form only is movable into and out of superposed relationship with respect to the other form.

14. Machinery according to claim 13, wherein said hinge has each of its flaps secured to a respective one of said forms and a hinge pin fast against rotation in the flap secured to said one form and free for rotation in the other flap, means being provided to rotate the hinge pin and thereby move said one form about the axis of said hinge pin.

15. Machinery according to claim 10, wherein said forms are adapted to subject hosiery articles mounted thereon to heat for heat setting the hose fabric, said forms having internal passages for the circulation of a heating medium therethrough.

16. Machinery according to claim 10, wherein said forms have outwardly ejectable tongues telescopically housed in free ends of said forms for advancing hosiery mounted thereon into hosiery dispensing means operable to draw said hosiery from the forms with the hosiery legs lying one on the other.

17. Machinery according to claim 16, wherein a push rod secured to each tongue extends through the length of the associated form to means for displacing the push rod and tongue lengthwise of the form in an outward direction against a return spring bias.

18. Machinery according to claim 10, wherein said hose carriers are mounted on an indexable turret for movement continually between hose-loading, toe-seaming and hose-transfer positions, and wherein the pair of boarding forms and a plurality of other pairs of identical forms, are mounted on another indexable turret for continual movement between hose-receiving and hose-discharge positions, and means is provided for indexing the two turrets in synchronism.

19. Apparatus for use in the manufacture of hosiery, comprising a first hose carrier at a first operation station; a second hose carrier at a second operation station; and a transfer mechanism for conveying hose off said first and onto said second hose carrier; said second carrier being aligned endwise with said first carrier, and said transfer mechanism being reciprocally movable along a straight path between said two carriers from a hose-collecting position spaced rearwardly of a free end of said first carrier which confronts a corresponding free end of said second carrier; and wherein a hose-engaging element of said transfer mechanism is positioned to enter engagement with a welt end of hose on the first carrier when said mechanism commences movement from said hose-collecting position, said element being operable to release said welt at a hose-depositing position reached when said transfer mechanism has moved along said path beyond the free end of said second carrier.

20. Apparatus according to claim 19, wherein said first carrier is an integral part of an everting hose loader which is operably associated with a hose machine which inserts gussets into pantihose crutches.

21. Apparatus according to claim 19, wherein said hose engaging element comprises at least one upstanding hooked member mounted on a carriage of said transfer mechanism.

22. Apparatus according to claim 21, wherein said hose engaging element is movable between an erect hose-engaging position and a lowered, hose-releasing position.

23. Apparatus according to claim 19, wherein drive means for said transfer mechanism comprises a motor and a drive transmission loop coupled to said mechanism, the motor being of unidirectional type and said transmission loop being connected to said mechanism by a lost motion coupling.

*24. Apparatus for use in the manufacture of pantihose comprising:*

*(a) a first machine for performing an operation in the manufacture of pantihose, said first machine including a plurality of first pantihose carriers thereon, said first carriers being movable and conveying pantihose elements past a station where said operation is carried out;*

*(b) a second machine located adjacent said first machine, said second machine performing a further operation in the manufacture of pantihose and including a plurality of second carriers thereon for pantihose, said second carriers being movable to become positioned during respective movement of same for transfer of* pantihose from one of said first carriers to one of said second carriers, at least one of said operations being a seaming operation, and (c) a transfer mechanism movable between said first and second machines, said transfer mechanism including a pantihose engaging element, said element being positioned to engage a waist portion of a pantihose located on said first carrier, remove said pantihose from said first carrier, transfer said pantihose to said second carrier and place said waist portion about said second carrier.

25. Apparatus as defined in claim 24, wherein one of said machines is a toe closer.

26. Apparatus as defined in claim 25, wherein the carrier of said toe closer comprises a pair of supports for legs of said pantihose.

27. Apparatus as defined in claim 24, wherein the carrier of said toe closer comprises an everter which comprises a pair of suction tube supports over which legs of said pantihose are drawn.

28. Apparatus for use in the manufacture of pantihose comprising:

(a) first and second machines for performing respective processing operations on pantihose elements, at least said first machine being operative to perform a seaming operation on said pantihose elements;

(b) said first machine having a plurality of first pantihose carriers thereon, said first carriers being movable and conveying said pantihose elements past said seaming station;

(c) said second machine being located adjacent said first machine and having a plurality of second carriers thereon for pantihose elements, said second carriers being movable, said first and second carriers being positioned during respective movements of same for transfer of pantihose from one of said first carriers to one of said second carriers, and (d) a transfer mechanism movable between said first and second machines, said transfer mechanism including a pantihose engaging element, said element being positioned to engage a waist portion of a pantihose located on said first carrier, remove said pantihose from said first carrier, transfer said pantihose to said second carrier and place said waist portion about said second carrier.

29. Apparatus as defined in claim 28, wherein said second carrier comprises two leg supports for legs of said pantihose and after said waist portion has been placed by said transfer mechanism about said carrier, said apparatus is operative to draw said pantihose over said carrier whereby said pantihose legs are disposed about said leg supports.

30. Apparatus as defined in claim 28, wherein one of said machines is a toe closer.

31. Apparatus as defined in claim 30, wherein the carrier of said toe closer comprises a pair of supports for legs of said pantihose.

32. Apparatus as defined in claim 30, wherein the carrier of said toe closer comprises an everter which comprises a pair of suction tube supports over which legs of said pantihose are drawn.

33. Apparatus for use in the manufacture of hosiery, comprising a first hose carrier at a first operation station whereat seaming of said hose is performed; a second hose carrier at a second operation station whereat a further processing operation is performed; and a transfer mechanism for conveying hose off said first and onto said second hose carrier; said second carrier being positioned in general end-wise alignment with respect to said first carrier for transfer of hose therebetween; and a transfer mechanism being movable from a hose-collecting position at said first carrier to a corresponding free end of said second carrier; and wherein a hose-engaging element of said transfer mechanism is positioned to enter engagement with a welt end of hose on the first carrier, remove said hose from said first carrier, transfer said hose to said second carrier, and position said welt end of said hose about said second carrier.

34. Apparatus as defined in claim 33 wherein said first hose carrier is an integral part of a toe closer.

35. Apparatus as defined in claim 33 wherein said first hose carrier is an integral part of a gusset inserter.

36. Apparatus as defined in claim 33 wherein said second hose carrier is an integral part of a toe closer.

37. Apparatus as defined in claim 33 wherein said second hose carrier is an integral part of a gusset inserter.

* * * * *